United States Patent
Harada

(10) Patent No.: US 9,346,901 B2
(45) Date of Patent: May 24, 2016

(54) METHOD FOR PRODUCING CHLORINATED VINYL CHLORIDE RESIN

(71) Applicant: TOKUYAMA SEKISUI CO., LTD., Osaka (JP)

(72) Inventor: Masatoshi Harada, Yamaguchi (JP)

(73) Assignee: TOKUYAMA SEKISUI CO., ;TD., Osaka (JP)

( * ) Notice: Subject to any disclaimer, the term of this patent is extended or adjusted under 35 U.S.C. 154(b) by 183 days.

(21) Appl. No.: 14/361,791

(22) PCT Filed: Nov. 30, 2012

(86) PCT No.: PCT/JP2012/081164
§ 371 (c)(1),
(2) Date: May 30, 2014

(87) PCT Pub. No.: WO2013/081133
PCT Pub. Date: Jun. 6, 2013

(65) Prior Publication Data
US 2015/0005455 A1 Jan. 1, 2015

(30) Foreign Application Priority Data
Dec. 2, 2011 (JP) ................................. 2011-264210

(51) Int. Cl.
*C08F 8/22* (2006.01)
*C08F 14/06* (2006.01)
*C08F 114/06* (2006.01)

(52) U.S. Cl.
CPC ................. *C08F 114/06* (2013.01); *C08F 8/22* (2013.01); *C08F 14/06* (2013.01)

(58) Field of Classification Search
CPC ........... C08F 8/22; C08F 14/06; C08F 114/06
USPC ....................................... 525/331.6, 356, 358
See application file for complete search history.

(56) References Cited

FOREIGN PATENT DOCUMENTS

| EP | 556625 | B1 * | 9/1996 |
|---|---|---|---|
| JP | 11-35627 | A | 2/1999 |
| JP | 11-263808 | A | 9/1999 |
| JP | 2000-119333 | A | 4/2000 |
| JP | 2001-151815 | A | 6/2001 |
| JP | 2002-60420 | A | 2/2002 |
| JP | 2002-060421 | * | 2/2002 |
| JP | 2002-60421 | A | 2/2002 |

OTHER PUBLICATIONS

International Search Report for corresponding International Application No. PCT/JP2012/081164, mailed Feb. 26, 2013 (2 pages).
Written Opinion for corresponding International Application No. PCT/JP2012/081164, mailed Feb. 26, 2013 (4 pages).

* cited by examiner

*Primary Examiner* — Roberto Rabago
(74) *Attorney, Agent, or Firm* — Oliff Liang LL

(57) ABSTRACT

Chlorinated vinyl chloride resin may be produced through a heat chlorination reaction of an aqueous suspension of vinyl chloride resin in a hermetically sealable reaction vessel, the method including carrying out a first heat chlorination reaction while raising the temperature of an aqueous suspension of a vinyl chloride resin powder to a predetermined temperature within the range of 85° C. to 95° C., and subsequently carrying out a second heat chlorination reaction at the predetermined temperature.

9 Claims, No Drawings

METHOD FOR PRODUCING CHLORINATED VINYL CHLORIDE RESIN

TECHNICAL FIELD

The present invention relates to a method for producing a chlorinated vinyl chloride resin, and more specifically to a method for producing a chlorinated vinyl chloride resin with excellent transparency.

BACKGROUND ART

Chlorinated vinyl chloride resins, which are produced by additional chlorination of vinyl chloride resins, not only have advantages of vinyl chloride resins such as excellent weather resistance, flame retardancy and chemical resistance, but also have a heat distortion temperature higher by 20 to 40° C. than that of a vinyl chloride resin, and therefore are preferably used in applications that require heat resistance up to 100° C., such as heat-resistant pipes, heat-resistant fittings, heat-resistant valves, and heat-resistant plates.

Because of its high heat distortion temperature, however, a chlorinated vinyl chloride resin has to be heated and melted at a high temperature for molding into a heat-resistant pipe, a heat-resistant fitting, a heat-resistant valve, a heat-resistant plate, or the like. In this context, a chlorinated vinyl chloride resin with poor thermal stability (initial discoloration resistance, heat-resistant stability) etc. cannot be molded into a transparent product and therefore is disadvantageous.

Additional chlorination of a vinyl chloride resin is conventionally performed by preparing an aqueous suspension of a vinyl chloride resin in a hermetically sealable reaction vessel and subjecting the aqueous suspension to ultraviolet irradiation while injecting chlorine into the reaction vessel. Recently, for production of a chlorinated vinyl chloride resin with excellent thermal stability, a chlorination method that simply involves heating without ultraviolet irradiation (heat chlorination) was developed. In addition, for the purpose of reducing the reaction time, addition of hydrogen peroxide during heat chlorination has been suggested.

An example is "a method for producing a chlorinated vinyl chloride resin by suspending polyvinyl chloride in an aqueous medium in a hermetically sealable vessel, reducing the interior pressure of the vessel, and chlorinating the polyvinyl chloride at a temperature of 90 to 140° C. while injecting chlorine into the vessel, the method being characterized in that, in the course of the chlorination, addition of hydrogen peroxide at a rate of 5 to 50 ppm/hr relative to the polyvinyl chloride is initiated when the chlorine content of the resulting polyvinyl chloride reaches or exceeds 60% by weight" (see Patent Literature 1, for example). In this literature, Example 1 has the following description: "200 kg of deionized water and 56 kg of PVC having an average degree of polymerization of 600 were charged into a 300-liter glass-lined reactor, the resultant mixture was stirred for dispersion of PVC in water, and then the reactor was heated to raise the interior temperature to 70° C. Subsequently, the interior pressure of the reactor was reduced to remove oxygen (oxygen level: 100 ppm), chlorine (oxygen content: 50 ppm) was then injected so that the partial pressure of chlorine was kept at 0.4 MPa, and thus a heat chlorination reaction started. After this, the temperature was further raised to 100° C. When the chlorine content reached 61% by weight, addition of a 200-ppm hydrogen peroxide solution at 15 ppm/hr in terms of hydrogen peroxide relative to PVC was initiated. Under fixed conditions at 100° C. and 0.4 MPa of partial chlorine pressure, when the chlorine content reached 65% by weight, the supply of chlorine gas was terminated to stop the chlorination. Then, nitrogen gas was supplied for removal of unreacted chlorine, and the resulting CPVC slurry was neutralized with sodium hydroxide, washed with water, dehydrated and then dried to give CPVC as a powder." As described above, Example 1 suggests a method in which chlorination is initiated at a low temperature, which is then raised to a predetermined temperature for further chlorination.

In the chlorination method described above, however, the temperature is not under control from the time when the chlorination starts with the injection of chlorine into the reactor until the time when the temperature has risen to the reaction temperature, but simply the temperature is allowed to rise as quickly as possible to the reaction temperature. For this reason, this method may produce a chlorinated vinyl chloride resin that is poor in thermal stability (initial discoloration resistance, heat-resistant stability) etc. and cannot be molded into a transparent product, and therefore is disadvantageous.

CITATION LIST

Patent Literature

Patent Literature 1: Japanese Patent Application Publication No. 2001-151815 (JP 2001-151815 A)

SUMMARY OF INVENTION

Technical Problem

In view of the above problems, the present invention is intended to provide a method for producing a chlorinated vinyl chloride resin that is excellent in thermal stability (initial discoloration resistance, heat-resistant stability) and can be molded into a transparent product.

Solution to Problem

The present invention relates to:
[1] a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 85° C. or higher and lower than 95° C., and subsequently carrying out a second heat chlorination reaction at the predetermined temperature,
the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 58% by weight or higher and lower than 60% by weight; and subsequently the second heat chlorination reaction is carried out at the predetermined temperature;
[2] a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 95° C. or higher and lower than 105° C., and subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 60% by weight or higher and lower than 62% by weight; and subsequently the second heat chlorination reaction is carried out at the predetermined temperature;

[3] a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 105 to 115° C., and subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 62 to 63% by weight; and subsequently the second heat chlorination reaction is carried out at the predetermined temperature;

[4] the method for producing a chlorinated vinyl chloride resin according to the above [1], [2], or [3], further comprising adding hydrogen peroxide at 5 to 30 ppm/Hr relative to the vinyl chloride resin during the second heat chlorination reaction; and

[5] the method for producing a chlorinated vinyl chloride resin according to the above [4], wherein the total amount of hydrogen peroxide added is 10 to 300 ppm relative to the vinyl chloride resin.

Advantageous Effects of Invention

The method of the present invention for producing a chlorinated vinyl chloride resin is constituted as described above and can easily produce a chlorinated vinyl chloride resin. The resulting chlorinated vinyl chloride resin is excellent in thermal stability, weather resistance, flame retardancy, chemical resistance, and the like, and a product molded from the chlorinated vinyl chloride resin has excellent transparency.

DESCRIPTION OF EMBODIMENTS

The method for producing a chlorinated vinyl chloride resin according to claim 1 is a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 85° C. or higher and lower than 95° C., and subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 58% by weight or higher and lower than 60% by weight; and subsequently the second heat chlorination reaction is carried out at the predetermined temperature.

The average degree of polymerization of the vinyl chloride resin is generally 600 to 2000. The vinyl chloride resin contains 50% by weight or more of a vinyl chloride homopolymer and a vinyl chloride monomer, and is a copolymer of a vinyl chloride monomer with a monomer copolymerizable with the vinyl chloride monomer. Examples of the monomer copolymerizable with vinyl chloride include vinyl esters such as vinyl acetate and vinyl propionate; (meth)acrylic acid esters such as methyl (meth)acrylate and ethyl (meth)acrylate; olefins such as ethylene and propylene; maleic anhydride; acrylonitrile; styrene; and vinylidene chloride.

The vinyl chloride resin powder preferably has an average particle diameter of 100 to 200 nm. This is because the handling is difficult when the particle diameter is too small and because chlorination is prolonged when the particle diameter is too large.

In the method for producing a chlorinated vinyl chloride resin, the heat chlorination reaction of a vinyl chloride resin in the form of an aqueous suspension is carried out in a hermetically sealable reaction vessel. The hermetically sealable reaction vessel is preferably a glass-lined pressure-resistant vessel equipped with a stirring device and a jacket for heating/cooling.

In the present invention, the heat chlorination reaction refers to a chlorination reaction that involves heating without ultraviolet irradiation.

The aqueous suspension of a vinyl chloride resin powder can be obtained by adding and dispersing a vinyl chloride resin powder in water with stirring. Alternatively, a vinyl chloride resin powder produced by aqueous suspension polymerization can be used as it is because such a vinyl chloride resin powder is in the form of an aqueous suspension.

The first heat chlorination reaction is carried out while the temperature of the aqueous suspension of a vinyl chloride resin powder is being raised to a predetermined temperature within the range of 85° C. or higher and lower than 95° C. Specifically, the first heat chlorination reaction is initiated with the injection of chlorine gas into the reaction vessel when the temperature of the aqueous suspension is 55 to 70° C.; and then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 58% by weight or higher and lower than 60% by weight.

In a preferred example, before the start of the first heat chlorination reaction, the hermetically sealable reaction vessel that contains the aqueous suspension of a vinyl chloride resin powder is heated and the interior pressure of the reaction vessel is reduced for removal of oxygen; and then when the temperature of the aqueous suspension reaches a temperature to be set for the start of the heat chlorination reaction, the first heat chlorination reaction is initiated with the injection of chlorine gas into the reaction vessel.

For the pressure reduction, it is preferable that deaeration is performed by suction with a vacuum pump. In a preferable example, suction is carried out until the interior pressure of the reaction vessel reaches about the sum of the present water vapor pressure and the pressure corresponding to 20 mm of mercury column, and the pressure is maintained for several minutes to achieve first deaeration; nitrogen is then injected into the reaction vessel, the system is left stand for a while, and the second deaeration is performed by suction with a vacuum pump for removal of oxygen; and a series of these operations is repeated to make the oxygen level inside the reaction vessel equal to or lower than 100 ppm. The heating is preferably carried out with steam or hot water supplied into a jacket of the reaction vessel.

The heat chlorination reaction is initiated with the injection of chlorine gas into the reaction vessel when the temperature of the aqueous suspension reaches a temperature to be set for the start of the heat chlorination reaction, in other words, when it reaches 55 to 70° C. Chlorine gas is preferably pure, but commercially available chlorine gas containing 1000 ppm or more of oxygen may also be used as it is.

When the temperature of the aqueous suspension is too low, the heat chlorination reaction hardly proceeds and is inefficient. Therefore, the first heat chlorination reaction is initiated at a temperature of 55° C. or higher. The present invention is characterized by carrying out the early phase of the heat chlorination reaction at a temperature that does not exceed the glass transition temperature of a chlorinated vinyl chloride resin (namely, a chlorinated product of vinyl chloride resin) in the reaction vessel. This is because when the temperature during the early phase of the heat chlorination reaction exceeds the glass transition temperature, the thermal stability of the resulting chlorinated vinyl chloride resin decreases and the transparency of a molded product thereof decreases. Therefore, the first heat chlorination reaction is initiated at a temperature of 70° C. or lower.

After the first heat chlorination starts, the interior temperature of the reaction vessel is raised to a predetermined temperature within the range of 85° C. or higher and lower than 95° C. without exceeding the glass transition temperature of the chlorinated vinyl chloride resin in the reaction vessel, and with the temperature rise, the first heat chlorination reaction is allowed to proceed in such a manner that the chlorine content of the chlorinated vinyl chloride resin in the reaction vessel can reach 58% by weight or higher and lower than 60% by weight when the predetermined temperature is reached.

Since the vinyl chloride resin in the reaction vessel is chlorinated into a chlorinated vinyl chloride resin during the reaction, the chlorine content of the resulting product gradually increases, and accordingly, the glass transition temperature thereof rises. Therefore, the chlorination reaction is carried out under such conditions that the internal temperature of the reaction vessel is controlled so as to rise without exceeding the glass transition temperature of the chlorinated vinyl chloride resin in the reaction vessel and that the chlorine content of the chlorinated vinyl chloride resin in the reaction vessel can reach 58% by weight or higher and lower than 60% by weight when the predetermined temperature is reached.

The second heat chlorination reaction is carried out at the predetermined temperature within the range of 85° C. or higher and lower than 95° C. When the temperature during the heat chlorination is equal to or higher than the glass transition temperature of the further chlorinated vinyl chloride resin, the thermal stability of the resulting chlorinated vinyl chloride resin tends to be reduced and the transparency of a molded product thereof tends to be reduced. Therefore, the temperature during the second heat chlorination reaction also preferably does not exceed the glass transition temperature of the further chlorinated vinyl chloride resin.

For the purpose of increasing the rate of heat chlorination and reducing the reaction time, hydrogen peroxide may be added. The addition of hydrogen peroxide with the temperature rise (during the first heat chlorination reaction) increases the reaction rate and thus raises the temperature, which makes it difficult to control the reaction temperature. On the other hand, an increase in the chlorine content of the chlorinated vinyl chloride resin leads to a decrease in the chlorination rate. Therefore, hydrogen peroxide is preferably added during the second heat chlorination reaction.

When the addition rate of hydrogen peroxide is too low, the effect of enhancing the reaction rate tends not to be exhibited. On the other hand, when the addition rate of hydrogen peroxide is too high, the thermal stability of the resulting chlorinated vinyl chloride resin tends to be impaired. Therefore, the addition rate is preferably 5 to 30 ppm/Hr relative to the vinyl chloride resin. When the total amount of hydrogen peroxide added is too small, the effect of enhancing the reaction rate tends not to be exhibited. On the other hand, when the total amount of hydrogen peroxide added is too large, the thermal stability tends to be impaired. Therefore, the total amount of hydrogen peroxide added is preferably 10 to 300 ppm and more preferably 15 to 200 ppm relative to the vinyl chloride resin. Hydrogen peroxide may be added either continuously or intermittently.

When the chlorine content of the chlorinated vinyl chloride resin reaches a predetermined level, the second heat chlorination reaction is terminated. The termination of the second heat chlorination reaction can be easily achieved by releasing unreacted chlorine gas, followed by cooling. By washing the resulting slurry of chlorinated vinyl chloride resin with water for removal of hydrochloric acid, followed by optional addition of a neutralizer and/or the like thereto, and subsequent dehydration and drying, a chlorinated vinyl chloride resin powder having a predetermined chlorine content can be obtained. The chlorine content of the chlorinated vinyl chloride resin obtained by the production method according to claim 1 is not particularly limited and is preferably 60 to 72% by weight.

The method for producing a chlorinated vinyl chloride resin according to claim 2 is a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 95° C. or higher and lower than 105° C., and subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 60% by weight or higher and lower than 62% by weight; and subsequently the second heat chlorination reaction is carried out at the predetermined temperature.

The method for producing a chlorinated vinyl chloride resin according to claim 2 will be explained below only in terms of the differences from the method for producing a chlorinated vinyl chloride resin according to claim 1.

In the method for producing a chlorinated vinyl chloride resin according to claim 2, after the first heat chlorination starts, the interior temperature of the reaction vessel is raised to a predetermined temperature within the range of 95° C. or higher and lower than 105° C. without exceeding the glass transition temperature of the chlorinated vinyl chloride resin in the reaction vessel, and with the temperature rise, the first heat chlorination reaction is allowed to proceed in such a manner that the chlorine content of the chlorinated vinyl chloride resin in the reaction vessel can reach 60% by weight or higher and lower than 62% by weight when the predetermined temperature is reached.

Since the predetermined temperature in the second heat chlorination reaction is as high as 95° C. or higher and lower than 105° C., it takes long to reach the predetermined temperature, but such a high reaction temperature increases the reaction rate in the second heat chlorination reaction, resulting in reduction in the total heat chlorination reaction time. The reaction temperature in the second heat chlorination reaction is higher but does not result in impaired thermal stability (initial discoloration resistance and heat-resistant stability) of the resulting chlorinated vinyl chloride resin.

The chlorine content of the chlorinated vinyl chloride resin obtained in the production method according to claim 2 is not particularly limited and is preferably 62 to 72% by weight.

The method for producing a chlorinated vinyl chloride resin according to claim 3 is a method for producing a chlorinated vinyl chloride resin through a heat chlorination reaction of a vinyl chloride resin in the form of an aqueous suspension in a hermetically sealable reaction vessel, the method comprising carrying out a first heat chlorination reaction while raising the temperature of an aqueous suspension of a vinyl chloride resin powder to a predetermined temperature within the range of 105 to 115° C., and subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 62 to 63% by weight; and subsequently the second heat chlorination reaction is carried out at the predetermined temperature.

The method for producing a chlorinated vinyl chloride resin according to claim 3 will be explained below only in terms of the differences from the method for producing a chlorinated vinyl chloride resin according to claim 1.

In the method for producing a chlorinated vinyl chloride resin according to claim 3, after the first heat chlorination starts, the interior temperature of the reaction vessel is raised to a predetermined temperature within the range of 105 to 115° C. without exceeding the glass transition temperature of the chlorinated vinyl chloride resin in the reaction vessel, and with the temperature rise, the first heat chlorination reaction is allowed to proceed in such a manner that the chlorine content of the chlorinated vinyl chloride resin in the reaction vessel can reach 62 to 63% by weight when the predetermined temperature is reached.

Since the predetermined temperature in the second heat chlorination reaction is as high as 105 to 115° C., it takes long to reach the predetermined temperature, but such a high reaction temperature increases the reaction rate in the second heat chlorination reaction, resulting in reduction in the total heat chlorination reaction time. The reaction temperature in the second heat chlorination reaction is higher but does not result in impaired thermal stability (initial discoloration resistance and heat-resistant stability) of the resulting chlorinated vinyl chloride resin.

The chlorine content of the chlorinated vinyl chloride resin obtained in the production method according to claim 3 is not particularly limited and is preferably 63 to 72% by weight.

EXAMPLES

Examples of the present invention will be described below. The scope of the present invention is, however, not limited to these examples.

Example 1

Into a 300-liter glass-lined reaction vessel, 200 kg of deionized water and 56 kg of vinyl chloride resin powder having an average degree of polymerization of 600 (average particle diameter: 120 μm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 90° C. over 1.1 hours.

The resulting chlorinated vinyl chloride resin powder in the reaction vessel was sampled 0.55 hour after the start of the first heat chlorination reaction, and the glass transition temperature was found to be 86.6° C. The temperature of the aqueous suspension at the time of sampling was 80° C.

The chlorinated vinyl chloride resin powder in the reaction vessel was sampled 1.1 hours after the start of the first heat chlorination reaction. The chlorine content was found to be 58.2% by weight, and the glass transition temperature was found to be 91.1° C. The temperature of the aqueous suspension at the time of sampling was 90° C. These results indicate that, during the first heat chlorination reaction (while the temperature was being raised), the temperature of the aqueous suspension in the reaction vessel did not exceed the glass transition temperature of the chlorinated vinyl chloride resin in the reaction vessel.

While the heat chlorination reaction temperature and the partial chlorine pressure were kept at 90° C. and 0.4 MPa, respectively, the second chlorination reaction was allowed to proceed for 8.7 hours. The heat chlorination reaction (the first heat chlorination reaction and the second heat chlorination reaction combined) was thus carried out for 9.8 hours after the injection of chlorine started. Subsequently, the supply of chlorine gas was terminated to stop the heat chlorination reaction. From the time when the chlorine content reached 61% by weight until the end of the heat chlorination reaction, a 200-ppm hydrogen peroxide solution was continuously added at 15 ppm/Hr in terms of hydrogen peroxide relative to the vinyl chloride resin. The total amount of hydrogen peroxide added was 114 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.9% by weight and a glass transition temperature of 134.3° C.

Example 2

Into a 300-liter glass-lined reaction vessel, 200 kg of deionized water and 56 kg of vinyl chloride resin powder having an average degree of polymerization of 600 (average particle diameter: 120 μm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 95° C. over 1.4 hours.

The resulting chlorinated vinyl chloride resin powder in the reaction vessel was sampled 0.7 hour after the start of the first heat chlorination reaction, and the glass transition temperature was found to be 93.7° C. The temperature of the aqueous suspension at the time of sampling was 83° C.

The chlorinated vinyl chloride resin powder in the reaction vessel was sampled 1.4 hours after the start of the first heat chlorination reaction. The chlorine content was found to be 60.7% by weight, and the glass transition temperature was found to be 105.8° C. The temperature of the aqueous suspension at the time of sampling was 95° C. These results indicate that, during the first heat chlorination reaction (while the temperature was being raised), the temperature of the aqueous suspension in the reaction vessel did not exceed the glass transition temperature of the chlorinated vinyl chloride resin in the reaction vessel.

While the heat chlorination reaction temperature and the partial chlorine pressure were kept at 95° C. and 0.4 MPa, respectively, the second heat chlorination reaction was allowed to proceed for 6.8 hours. The heat chlorination reaction (the first heat chlorination reaction and the second heat chlorination reaction combined) was thus carried out for 8.2 hours after the injection of chlorine started. Subsequently, the supply of chlorine gas was terminated to stop the heat chlorination reaction. From the time when the chlorine content reached 61% by weight until the end of the heat chlorination reaction, a 200-ppm hydrogen peroxide solution was continuously added at 15 ppm/Hr in terms of hydrogen peroxide relative to the vinyl chloride resin. The total amount of hydrogen peroxide added was 102 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 65.0% by weight and a glass transition temperature of 135.0° C.

Example 3

Into a 300-liter glass-lined reaction vessel, 200 kg of deionized water and 56 kg of vinyl chloride resin powder having an average degree of polymerization of 600 (average particle diameter: 120 μm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 100° C. over 2.0 hours.

The resulting chlorinated vinyl chloride resin powder in the reaction vessel was sampled 1.0 hour after the start of the first heat chlorination reaction, and the glass transition temperature was found to be 94.5° C. The temperature of the aqueous suspension at the time of sampling was 85° C.

The chlorinated vinyl chloride resin powder in the reaction vessel was sampled 2.0 hours after the start of the first heat chlorination reaction. The chlorine content was found to be 61.0% by weight, and the glass transition temperature was found to be 108.0° C. The temperature of the aqueous suspension at the time of sampling was 100° C. These results indicate that, during the first heat chlorination reaction (while the temperature was being raised), the temperature of the aqueous suspension in the reaction vessel did not exceed the glass transition temperature of the chlorinated vinyl chloride resin in the reaction vessel.

While the heat chlorination reaction temperature and the partial chlorine pressure were kept at 100° C. and 0.4 MPa, respectively, the second heat chlorination reaction was allowed to proceed for 4.5 hours. The heat chlorination reaction (the first heat chlorination reaction and the second heat chlorination reaction combined) was thus carried out for 6.5 hours after the injection of chlorine started. Subsequently, the supply of chlorine gas was terminated to stop the heat chlorination reaction. From the time right after the start of the second heat chlorination reaction until the end thereof, a 200-ppm hydrogen peroxide solution was continuously added at 15 ppm/Hr in terms of hydrogen peroxide relative to the vinyl chloride resin. The total amount of hydrogen peroxide added was 67.5 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.8% by weight and a glass transition temperature of 133.5° C.

Example 4

Into a 300-liter glass-lined reaction vessel, 200 kg of deionized water and 56 kg of vinyl chloride resin powder having an average degree of polymerization of 600 (average particle diameter: 120 m, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 110° C. over 2.6 hours.

The resulting chlorinated vinyl chloride resin powder in the reaction vessel was sampled 1.3 hours after the start of the first heat chlorination reaction, and the glass transition temperature was found to be 99.3° C. The temperature of the aqueous suspension at the time of sampling was 90° C.

The chlorinated vinyl chloride resin powder in the reaction vessel was sampled 2.6 hours after the start of the first heat chlorination reaction. The chlorine content was found to be 62.5% by weight, and the glass transition temperature was found to be 118.6° C. The temperature of the aqueous suspension at the time of sampling was 110° C. These results indicate that, during the first heat chlorination reaction (while the temperature was being raised), the temperature of the aqueous suspension in the reaction vessel did not exceed the glass transition temperature of the chlorinated vinyl chloride resin in the reaction vessel.

While the heat chlorination reaction temperature and the partial chlorine pressure were kept at 110° C. and 0.4 MPa, respectively, the second heat chlorination reaction was allowed to proceed for 1.6 hours. The heat chlorination reaction (the first heat chlorination reaction and the second heat chlorination reaction combined) was thus carried out for 4.2 hours after the injection of chlorine started. Subsequently, the supply of chlorine gas was terminated to stop the heat chlorination reaction. From the time right after the start of the second chlorination reaction until the end thereof, a 200-ppm hydrogen peroxide solution was continuously added at 15 ppm/Hr in terms of hydrogen peroxide relative to the vinyl chloride resin. The total amount of hydrogen peroxide added was 24 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.0% by weight and a glass transition temperature of 135.0° C.

Comparative Example 1

Into a 300-liter glass-lined reaction vessel, 200 kg of deionized water and 56 kg of vinyl chloride resin powder having an average degree of polymerization of 600 (average particle diameter: 120 µm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 95° C. over 0.5 hour.

When the temperature of the aqueous suspension reached 95° C., the resulting chlorinated vinyl chloride resin powder was sampled. The chlorine content was found to be 58.0% by weight, and the glass transition temperature was found to be 86.6° C. This result indicates that, while being raised, the temperature of the aqueous suspension in the reaction vessel exceeded the glass transition temperature of the chlorinated vinyl chloride resin in the reaction vessel.

While the heat chlorination reaction temperature and the partial chlorine pressure were kept at 95° C. and 0.4 MPa, respectively, the second heat chlorination reaction was allowed to proceed for 7.4 hours. The heat chlorination reaction (the first heat chlorination reaction and the second heat chlorination reaction combined) was thus carried out for 7.9 hours after the injection of chlorine gas started. Subsequently, the supply of chlorine gas was terminated to stop the heat chlorination reaction. From the time when the chlorine content reached 61% by weight until the end of the chlorination reaction, a 200-ppm hydrogen peroxide solution was continuously added at 15 ppm/Hr in terms of hydrogen peroxide relative to the vinyl chloride resin. The total amount of hydrogen peroxide added was 111 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.8% by weight and a glass transition temperature of 133.5° C.

Comparative Example 2

Into a 300-liter glass-lined reaction vessel, 200 kg of deionized water and 56 kg of vinyl chloride resin powder having an average degree of polymerization of 600 (average particle diameter: 120 µm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 100° C. over 0.7 hour.

When the temperature of the aqueous suspension reached 100° C., the resulting chlorinated vinyl chloride resin powder was sampled. The chlorine content was found to be 58.9% by weight, and the glass transition temperature was found to be 93.0° C. This result indicates that, while being raised, the temperature of the aqueous suspension in the reaction vessel exceeded the glass transition temperature of the chlorinated vinyl chloride resin in the reaction vessel.

While the heat chlorination reaction temperature and the partial chlorine pressure were kept at 100° C. and 0.4 MPa, respectively, the second heat chlorination reaction was allowed to proceed for 5.4 hours. The heat chlorination reaction (the first heat chlorination reaction and the second heat chlorination reaction combined) was thus carried out for 6.1 hours after the injection of chlorine started. Subsequently, the supply of chlorine gas was terminated to stop the heat chlorination reaction. From the time when the chlorine content reached 61% by weight until the end of the chlorination reaction, a 200-ppm hydrogen peroxide solution was continuously added at 15 ppm/Hr in terms of hydrogen peroxide relative to the vinyl chloride resin. The total amount of hydrogen peroxide added was 81 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.9% by weight and a glass transition temperature of 134.3° C.

Comparative Example 3

Into a 300-liter glass-lined reaction vessel, 200 kg of deionized water and 56 kg of vinyl chloride resin powder having an average degree of polymerization of 600 (average particle diameter: 120 μm, glass transition temperature: 82° C.) were charged, and the resultant mixture was stirred for dispersion of the vinyl chloride resin powder in water to give an aqueous suspension. The reaction vessel was then heated to raise the temperature of the aqueous suspension to 70° C. Subsequently, the interior pressure of the reaction vessel was reduced to remove oxygen (oxygen level: 100 ppm), chlorine gas (oxygen content: 50 ppm) was then injected so that the partial pressure of chlorine was kept at 0.4 MPa, and thus a heat chlorination reaction started. The first heat chlorination reaction was allowed to proceed while the temperature was being raised to 110° C. over 1.0 hour.

When the temperature of the aqueous suspension reached 110° C., the resulting chlorinated vinyl chloride resin powder was sampled. The chlorine content was found to be 59.4% by weight, and the glass transition temperature was found to be 96.5° C. This result indicates that, while being raised, the temperature of the aqueous suspension in the reaction vessel exceeded the glass transition temperature of the chlorinated vinyl chloride resin in the reaction vessel.

While the heat chlorination reaction temperature and the partial chlorine pressure were kept at 110° C. and 0.4 MPa, respectively, the second heat chlorination reaction was allowed to proceed for 2.8 hours. The heat chlorination reaction (the first heat chlorination reaction and the second heat chlorination reaction combined) was thus carried out for 3.8 hours after the injection of chlorine gas started. Subsequently, the supply of chlorine gas was terminated to stop the heat chlorination reaction. From the time when the chlorine content reached 61% by weight until the end of the chlorination reaction, a 200-ppm hydrogen peroxide solution was continuously added at 15 ppm/Hr in terms of hydrogen peroxide relative to the vinyl chloride resin. The total amount of hydrogen peroxide added was 42 ppm relative to the vinyl chloride resin.

Nitrogen gas was then supplied into the reaction vessel for removal of unreacted chlorine gas, and the resulting slurry of chlorinated vinyl chloride resin was neutralized with sodium hydroxide, washed with water, dehydrated and then dried to give a chlorinated vinyl chloride resin as a powder. The resulting chlorinated vinyl chloride resin had a chlorine content of 64.8% by weight and a glass transition temperature of 133.5° C.

The degree of yellowing, thermal stability, and degree of transparency of the chlorinated vinyl chloride resin obtained in each of the examples and comparative examples were measured, and the results are shown in Table 1. The methods for measuring these physical properties are shown below.

(1) Degree of Yellowing

A chlorinated vinyl chloride resin composition composed of 100 parts by weight of a chlorinated vinyl chloride resin, 2 parts by weight of a butyltin maleate stabilizer, 0.5 part by weight of butyl stearate, 5 parts by weight of an MBS resin, and 0.5 part by weight of a processing aid was fed on a roll at 190° C. for mixing. After the resin composition was taken up on the roll, mixing was continued for another 1 minute. The thus mixed resin composition was then fed into a press at 185° C., preheated for 3 minutes and then pressed (pressure applied: 20 MPa) for 4 minutes to give a specimen of 2-mm thickness. The degree of yellowing of the resulting specimen was measured with a color difference meter manufactured by Nippon Denshoku Industries Co., Ltd.

(2) Thermal Stability

The chlorinated vinyl chloride resin composition was fed on a roll at 190° C. for mixing. After the resin composition was taken up on the roll, mixing was continued for another 1 minute to give a sheet of about 0.5-mm thickness. The resulting sheet was heated in a gear oven at 200° C. and measured for the amount of time (minute) required until it turned black.

(3) Degree of Transparency

The chlorinated vinyl chloride resin composition was fed on a roll at 165° C. for mixing. After the resin composition was taken up on the roll, mixing was continued for another 1 minute. Then, the thus mixed resin composition was fed into a press at 165° C., preheated for 3 minutes and then pressed (pressure applied: 20 MPa) for 4 minutes to give a specimen of 5-mm thickness. The degree of transparency of the resulting specimen was measured with a HAZE METER manufactured by Nippon Denshoku Industries Co., Ltd.

TABLE 1

|  | Example | | | | Comparative Example | | |
| --- | --- | --- | --- | --- | --- | --- | --- |
|  | 1 | 2 | 3 | 4 | 1 | 2 | 3 |
| Second heat chlorination reaction temperature (° C.) | 90 | 95 | 100 | 110 | 95 | 100 | 110 |
| Chlorine content of chlorinated vinyl chloride resin at time when second heat chlorination reaction temperature was reached (wt %) | 58.2 | 60.7 | 61.0 | 62.5 | 58.0 | 58.9 | 59.4 |
| Glass transition temperature of chlorinated vinyl chloride resin at time when second heat chlorination reaction temperature was reached (° C.) | 91.1 | 105.8 | 108.0 | 118.6 | 86.6 | 93.0 | 96.5 |
| First heat chlorination reaction time (amount of time to raise temperature) (Hr) | 1.1 | 1.4 | 2.0 | 2.6 | 0.5 | 0.7 | 1.0 |
| Second heat chlorination reaction time (Hr) | 8.7 | 6.8 | 4.5 | 1.6 | 7.4 | 5.4 | 2.8 |
| Heat chlorination reaction time (first heat chlorination reaction time + second heat chlorination reaction time) | 9.8 | 8.2 | 6.5 | 4.2 | 7.9 | 6.1 | 3.8 |

TABLE 1-continued

|  |  | Example | | | | Comparative Example | | |
| --- | --- | --- | --- | --- | --- | --- | --- | --- |
|  |  | 1 | 2 | 3 | 4 | 1 | 2 | 3 |
| (Hr) Physical properties of chlorinated vinyl chloride resin | Glass transition temperature (° C.) | 134.3 | 135.0 | 133.5 | 135.0 | 133.5 | 134.3 | 133.5 |
|  | Chlorine content (wt %) | 64.9 | 65.0 | 64.8 | 65.0 | 64.8 | 64.9 | 64.8 |
|  | Degree of yellowing | 32 | 30 | 29 | 30 | 31 | 30 | 30 |
|  | Thermal stability (minute) | 60 | 60 | 70 | 70 | 60 | 70 | 60 |
|  | Degree of transparency (HAZE) | 4.8 | 5.0 | 4.5 | 4.7 | 32.0 | 28.0 | 35.0 |

INDUSTRIAL APPLICABILITY

The chlorinated vinyl chloride resin obtained by the method of the present invention for producing a chlorinated vinyl chloride resin is excellent in thermal stability, weather resistance, flame retardancy, chemical resistance, and the like, and a product molded from the chlorinated vinyl chloride resin has excellent transparency. Therefore, the chlorinated vinyl chloride resin can be preferably used as a building material and an industrial material.

The invention claimed is:

1. A method for producing a chlorinated vinyl chloride resin through a heat chlorination reaction of a vinyl chloride resin in the form of an aqueous suspension in a hermetically sealable reaction vessel, the method comprising:
   carrying out a first heat chlorination reaction while raising the temperature of an aqueous suspension of a vinyl chloride resin powder obtainable by dispersing a vinyl chloride resin powder in water to a predetermined temperature within a range of 85° C. or higher and lower than 95° C., and
   subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 58% by weight or higher and lower than 60% by weight; and subsequently the second heat chlorination reaction is carried out at the predetermined temperature.

2. A method for producing a chlorinated vinyl chloride resin through a heat chlorination reaction of a vinyl chloride resin in the form of an aqueous suspension in a hermetically sealable reaction vessel, the method comprising:
   carrying out a first heat chlorination reaction while raising the temperature of an aqueous suspension of a vinyl chloride resin powder obtainable by dispersing a vinyl chloride resin powder in water to a predetermined temperature within a range of 95° C. or higher and lower than 105° C., and
   subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 60% by weight or higher and lower than 62% by weight; and subsequently the second heat chlorination reaction is carried out at the predetermined temperature.

3. A method for producing a chlorinated vinyl chloride resin through a heat chlorination reaction of a vinyl chloride resin in the form of an aqueous suspension in a hermetically sealable reaction vessel, the method comprising:
   carrying out a first heat chlorination reaction while raising the temperature of an aqueous suspension of a vinyl chloride resin powder obtainable by dispersing a vinyl chloride resin powder in water to a predetermined temperature within a range of 105 to 115° C., and
   subsequently carrying out a second heat chlorination reaction at the predetermined temperature, the method being characterized in that the first heat chlorination reaction is initiated with the injection of chlorine gas into the reaction vessel when the temperature of the aqueous suspension is 55 to 70° C.; then while the interior temperature of the reaction vessel is being raised to the predetermined temperature without exceeding the glass transition temperature of a chlorinated vinyl chloride resin in the reaction vessel, the first heat chlorination reaction is allowed to proceed in such a manner that the chlorine content of the chlorinated vinyl chloride resin in the reaction vessel can reach 62 to 63% by weight; and subsequently the second heat chlorination reaction is carried out at the predetermined temperature.

4. The method of claim 1, further comprising adding hydrogen peroxide at 5 to 30 ppm/Hr relative to the vinyl chloride resin during the second heat chlorination reaction.

5. The method of claim 4, wherein the total amount of hydrogen peroxide added is 10 to 300 ppm relative to the vinyl chloride resin.

6. The method of claim 2, further comprising adding hydrogen peroxide at 5 to 30 ppm/Hr relative to the vinyl chloride resin during the second heat chlorination reaction.

7. The method of claim 6, wherein the total amount of hydrogen peroxide added is 10 to 300 ppm relative to the vinyl chloride resin.

8. The method of claim 3, further comprising adding hydrogen peroxide at 5 to 30 ppm/Hr relative to the vinyl chloride resin during the second heat chlorination reaction.

9. The method of claim 8, wherein the total amount of hydrogen peroxide added is 10 to 300 ppm relative to the vinyl chloride resin.

* * * * *